(12) United States Patent
Kojima et al.

(10) Patent No.: US 6,339,286 B1
(45) Date of Patent: Jan. 15, 2002

(54) CATHODE RAY TUBE WITH A NONGLARE MULTI-LAYERED FILM

(75) Inventors: Kunio Kojima, Kanagawa; Takashi Setsuda, Aichi; Takumi Takamura; Kouichi Kaneko, both of Gifu; Hideo Kusama, Kanagawa, all of (JP)

(73) Assignee: Sony Corporation (JP)

( * ) Notice: Subject to any disclaimer, the term of this patent is extended or adjusted under 35 U.S.C. 154(b) by 1417 days.

(21) Appl. No.: 08/658,447

(22) Filed: Jun. 5, 1996

Related U.S. Application Data

(63) Continuation of application No. 08/068,170, filed on May 28, 1993, now abandoned, which is a continuation-in-part of application No. 07/891,034, filed on Jun. 1, 1992, now abandoned.

(30) Foreign Application Priority Data

| Jun. 7, 1991 | (JP) | P3-136602 |
| Dec. 27, 1991 | (JP) | P3-359413 |
| May 29, 1992 | (JP) | P4-139040 |

(51) Int. Cl.[7] .................................................. H01J 29/10
(52) U.S. Cl. ........................ 313/474; 313/479; 313/466; 313/313
(58) Field of Search .............................. 313/478, 479, 313/313, 466, 474

(56) References Cited

U.S. PATENT DOCUMENTS 4,563,612 A * 1/1986 Deal et al. ................... 313/478
4,987,338 A * 1/1991 Itou et al. ................... 313/478

FOREIGN PATENT DOCUMENTS

JP 61-118946 * 10/1986

* cited by examiner

Primary Examiner—Vip Patel

(57) ABSTRACT

A cathode ray tube which comprises a front panel coated with a nonglare film having a multi-layered structure. The multi-layered structure comprises at least a visible light absorbing layer containing a black dye, and an antistatic layer containing an inorganic metal compound as a conductive agent.

18 Claims, 8 Drawing Sheets

FIG. 3A
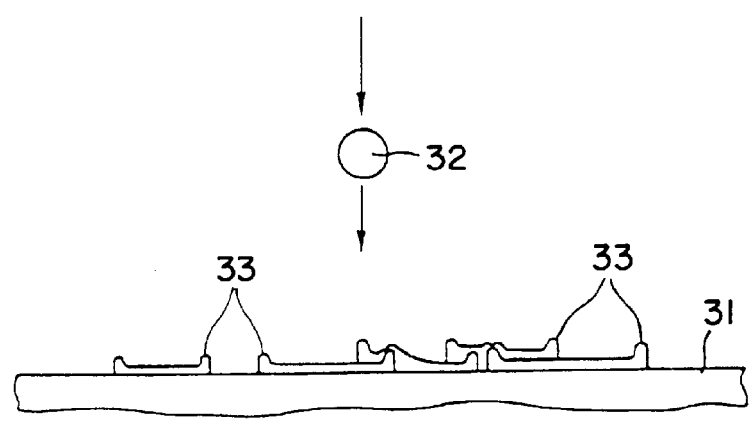
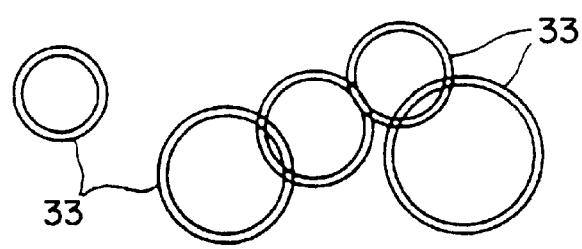
FIG. 3B
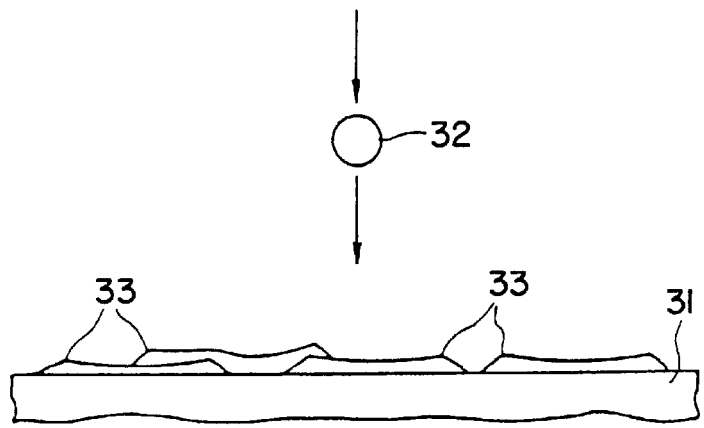
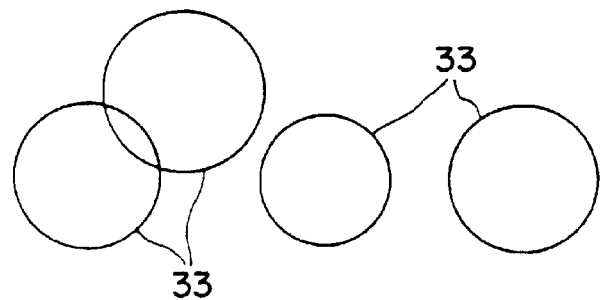

71

TEMPERATURE OF THE PANEL

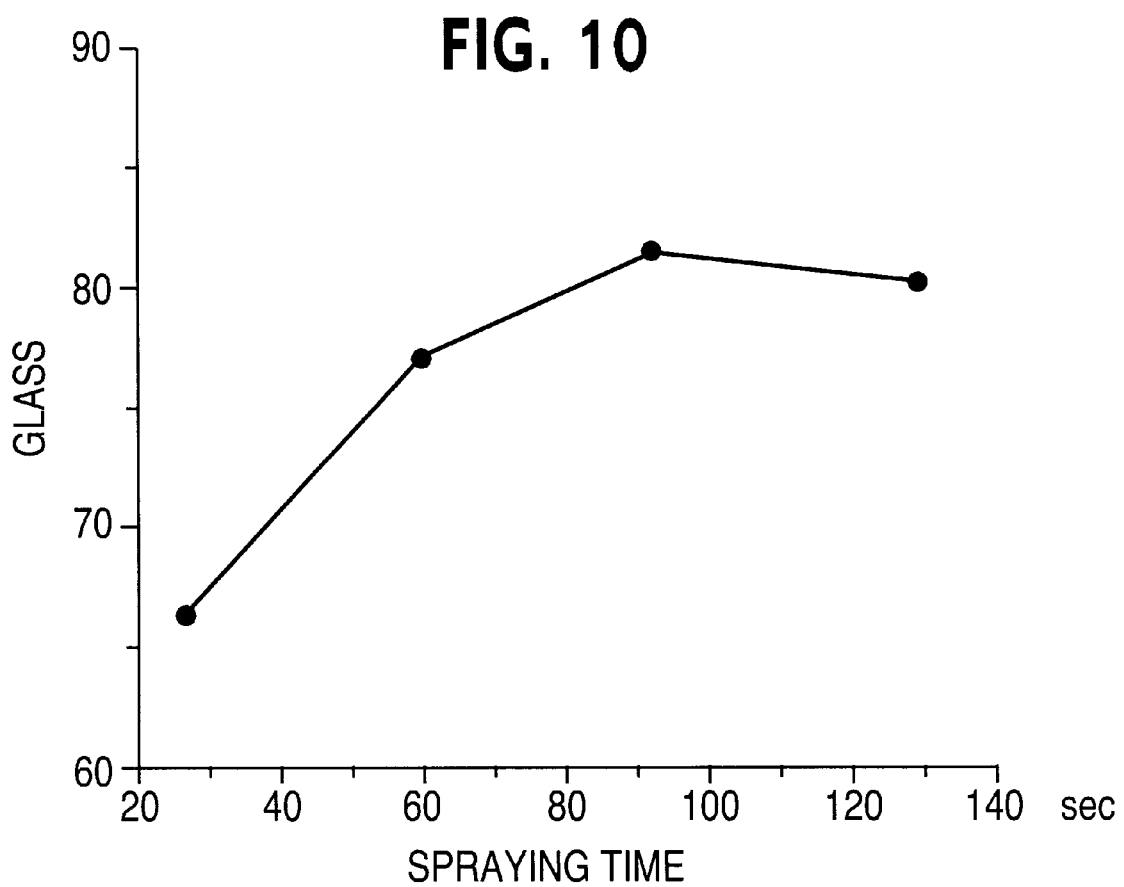

CATHODE RAY TUBE WITH A NONGLARE MULTI-LAYERED FILM

RELATED APPLICATION

This application is a continuation application of application U.S. Ser. No. 08/068,170 filed May 28, 1993, now abandoned which is a continuation-in-part application of U.S. Ser. No. 07/891,034 filed Jun. 1, 1992, now abandoned.

BACKGROUND OF THE INVENTION

1. Field of the Invention

The present invention relates to a cathode ray tube (CRT) for use in a terminal display for a computer, a TV set, etc., and more particularly to a nonglare film and a method of forming a nonglare film on a display surface of a display.

2. Description of the Related Art

In recent years, there has been an increased need to prevent the glare due to the reflection of external light on a display surface of a terminal display for a computer, a TV set, etc. To meet this need, various glare-proof means have been used with CRTs. For example, a panel formed with a metal multi-layer antireflection film has been attached to the front surface of a CRT. Another means employs a rough surface that has been formed by chemical etching directly onto the front panel of a CRT in order to scatter external light. Yet another utilizes a coating film formed on a surface of the front panel to exhibit a glare-proof effect. These means are found, for example, in Japanese Patent Laid-open Publication Nos. 60-109134, 60-129778, 60-14685, and 63-80451, and U.S. Pat. No. 4,563,612. In particular, the '612 patent discloses a cathode ray tube comprising an antistatic, glare-reducing coating having a silicate material and a metallic compound.

However, the above-mentioned related art glare-proof means have the following drawbacks. As for the nonglare means the panel formed with the metal multi-layer antireflection film attached to the front surface of a CRT, the cost is greatly increased, and therefore such a CRT is not suitable for general users. As for the glare-proof means using a CRT with a rough surface directly formed on the front panel itself, the cost can be reduced, but a problem remains with resolution. Further, in the nonglare means utilizing a coating film formed on the surface of the front, there is a possibility that the quality of a reproduced image will be lowered when applying the glare-proof means to a high-definition type CRT, such as a graphic display. That is, enhancement of a glare-proof effect causes an increase in scattered light. As a result, the surface of the front panel looks whitish in bright places, consequently reducing the sharpness of the reproduced image.

Moreover, there is a further need to reduce the accumulation of dust on the CRT front panel. A known technique is to form an antistatic film on the surface of the front panel in order to prevent deposition of dust on the surface of the front panel (for example, Japanese Patent Laid-open Publication Nos. 61-16452, 1-251545, 1-276534, and U.S. Pat. No. 4,563,612).

Accordingly, there is a demand for a high definition type CRT capable of exhibiting an antistatic effect as well as the above-mentioned nonglare effect.

SUMMARY OF THE INVENTION

It is the primary object of the present invention to provide a cathode ray tube which can exhibit a nonglare effect and antistatic effect without lowering the quality of a reproduced image.

In accordance with the present invention, there is provided a cathode ray tube comprising a front panel coated with a nonglare film having a multi-layered structure. The multi-layered structure comprises at least a visible light absorbing layer containing a black dye, and an antistatic layer containing an inorganic metal compound as a conductive agent.

In a preferred embodiment, the cathode ray tube includes a visible light absorbing layer formed between the front panel and the antistatic layer.

Further, the nonglare film may be formed by using a water absorbing solvent selected from the group consisting of ethylene glycol, glycerol, diethylene glycol, propylene glycol, triethylene glycol, and hexylene glycol.

In accordance with the another aspect of the present invention, there is provided a method of manufacturing a cathode ray tube having a front panel coated with a nonglare film comprising: cleaning the front panel, heating the front panel for drying, forming a visible light-absorbing layer on the front panel by spraying a first ethyl silicate solution which contains 0.1–0.5 wt % black dye and 1–10 wt % $SiO_2$, forming an antistatic layer on the front panel by spraying a second ethylsilicate solution which contains 40–60 wt % inorganic metal as a conductive agent in a solid content and 1–10 wt % $SiO_2$, and baking the front panel to harden the nonglare film completely.

BRIEF DESCRIPTION OF THE DRAWINGS

FIG. 3A is a side and plan view of the layer having an irregular surface to be formed on a front panel by depositing a coating liquid and drying rapidly;

FIG. 3B is a side and plan view of the layer having a smooth surface to be formed on the front panel by depositing a coating liquid;

FIG. 10 is a graph illustrating a relation between the gloss and the spraying time.

DETAILED DESCRIPTION OF THE PREFERRED EMBODIMENTS

There will now be described some preferred embodiments of the present invention with reference to the drawings.

Figure 1:
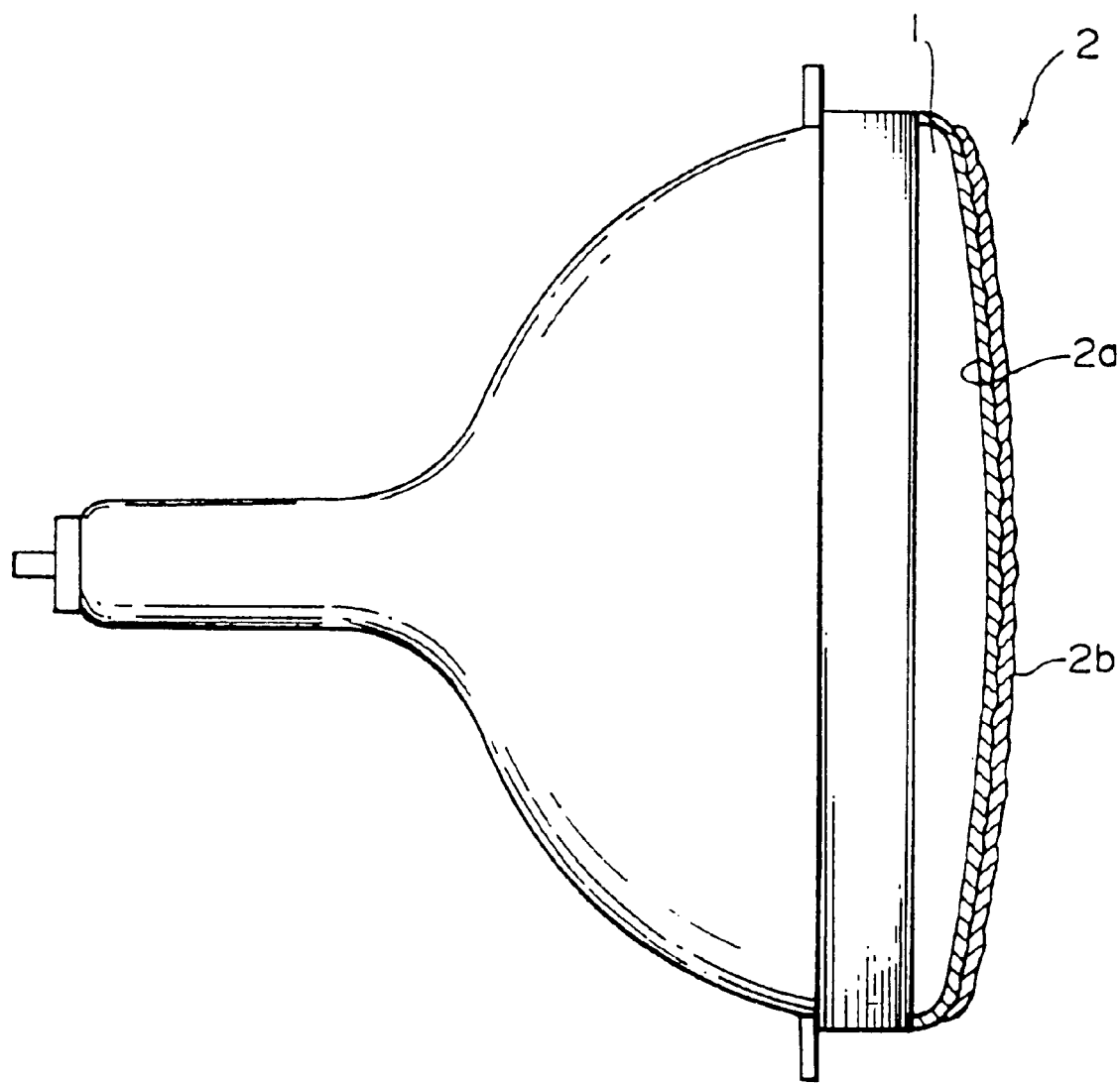
FIG. 1 is a side view, partially in section, of a cathode ray tube according to a first preferred embodiment of the present invention.

FIG. 1 is a side view, partially in section, of a cathode ray tube (CRT) according to a first preferred embodiment of the present invention. The CRT illustrated is of a high-definition type to be applied to terminal display for a computer, for example. While a known electron gun or the like (not shown) is provided in the CRT, the detailed explanation thereof will be omitted because it is not directly related to the scope of the present invention.

Referring to FIG. 1, reference numeral 1 denotes a front panel of the CRT, and reference numeral 2 denotes a nonglare film formed on the front panel 1 by a method to be hereinafter described. The nonglare film 2 serves to prevent the glare due to scattered light. The nonglare film 2 has a double-layered structure consisting of a visible light absorbing layer 2a formed on the front panel 1 and an antistatic layer 2b formed on the visible light absorbing layer 2a. The visible light absorbing layer 2a contains a black dye to prevent the front panel 1 from appearing whitish in bright places, and the antistatic layer 2b contains an inorganic metal compound to prevent deposition of dust or the like, electrical shock, etc., due to static electricity.

A method for forming the nonglare film 2 will now be described. First, the front panel 1 of the CRT constructed by an ordinary process, is heated for drying at 100° C. or lower, preferably 30–60° C. Then, an ethyl silicate solution containing 0.1–0.5 wt % of a black dye, which is primarily composed of C.I. solvent Black 5, and 1–10 wt % of $SiO_2$ for scattering of light is sprayed onto a surface of the front panel 1 at a flow rate of 0.2–0.5 ml/sec.

Thus, the surface of the front panel 1 is subjected to glare-proof treatment so that a surface roughness becomes Rmax≦0.3 $\mu$m and Rz≦0.2 $\mu$m, and the visible light absorptivity due to the black dye becomes 10–30% (assuming that the absorptivity is 0% in the absence of the black dye). In this way, the visible light absorbing layer 2a is formed.

In the next step, an ethyl silicate solution containing 40–60 wt % of an inorganic metal compound, such as metal oxide, including at least a metal selected from the group consisting of tin, gold, palladium, platinum, iron, titanium, and aluminum as a conductive agent in a solid content and 1–10 wt % of powder of $SiO_2$ is sprayed onto the visible light absorbing layer 2a formed on the surface of the front panel 1 at a flow rate of 0.2–0.5 ml/sec. The particle size of the metal oxide is preferably smaller than 0.01 $\mu$m. If the particle size is larger than 0.01 $\mu$m, the surface roughness becomes too large. In this way, the antistatic layer 2b is formed.

A concentration of $SiO_2$ in the ethyl silicate solution is preferably about seven wt %. This is due to the fact that if the concentration of $SiO_2$ is too small, the required increase in the number of coatings reduces production efficiency, while if the concentration of $SiO_2$ is too large, a coating film becomes nonuniform.

In the next step, the coating film is baked at 150–200° C. for 10–30 minutes to vaporize an ethyl component of the coating liquid, thus completing a nonglare film 2 having a double-layered structure. A thickness of the nonglare film 2 (i.e., a total thickness of the visible light absorbing layer 2a and the antistatic layer 2b) is preferably about 0.5 $\mu$m.

An example of the above forming method for the nonglare film 2 will now be described more specifically. First, the surface of the front panel 1 of a 20-inch CRT is cleaned, and it is then preheated at 45° C. for 10 minutes.

Then, an ethyl silicate solution is sprayed onto the surface of the front panel 1 to form the nonglare film 2. In this case, each of the visible light absorbing layer 2a and the antistatic layer 2b is formed by spraying the ethyl silicate solution for 50 seconds with a distance between the surface of the front panel 1 and a spray nozzle (not shown) set to 23 cm.

The ethyl silicate solution used to form the visible light absorbing layer 2a contains 0.3 wt % of a black dye and 5 wt % of $SiO_2$, while the ethyl silicate solution used to form the antistatic layer 2b contains 50 wt % of metal oxide as a conductive agent in a solid content and 3 wt % of $SiO_2$.

Thereafter, the coating film is baked at 170° C. for 20 minutes to form the nonglare film 2 having a fine surface roughness. Both the visible light absorbing layer 2a and the antistatic layer 2b has a thickness of about 0.25 $\mu$m. Further, a visible light absorptivity of the nonglare film 2 is about 30%.

According to this embodiment, it has been found that the CRT in has a resolution of 60 lines/cm or more, thus resolution is maintained.

There will now be described second through sixth preferred embodiments of the present invention relating to a coating liquid and a coating method therefor applied to the nonglare treatment of a front panel of a CRT, with reference to FIG. 2 and FIG. 3.

Figure 2A:
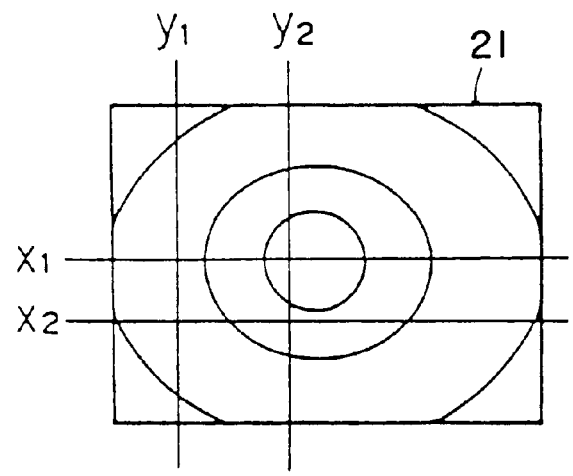
FIG. 2A is a front elevation of a front panel of a cathode ray tube according to second, third, fourth, fifth, and sixth preferred embodiments of the present invention, illustrating a luminance distribution.

In the second preferred embodiment, there is employed an already completed CRT having a front panel with a certain luminance distribution. That is, as shown in FIG. 2A, a front panel 21 of the CRT has a luminance distribution shown by contour lines such that luminance is high at a central portion and low at a peripheral portion. In a first step of the nonglare treatment of the front panel 11 of the CRT, a surface of the front panel 11 is polished with cerium oxide, and the cerium oxide is then removed to thereby clean the surface of the front panel 21.

Then, the front panel 21 is preheated to about 40° C. for about 10 minutes. Such a preheating step is carried out for the purpose of slowing the drying rate of a coating liquid to be applied later to the front panel 21. The temperature of 40° C. is a temperature which can be more easily maintained through all seasons of the year. If the drying rate of the coating liquid is excessively slow, the coating liquid flows and thereby becomes scaly so that it cannot be put into practical use. For these reasons, the temperature of about 40° C. is an optimum temperature for preheating of the front panel 21.

In the next step, a coating liquid is sprayed onto the surface of the front panel by using a spray coating device of a two-fluid air atomizing type. The coating liquid is an ethyl silicate solution containing 0.3 wt % of a black dye (C.I. solvent Black 5), 3.0 wt % of silica, and 4.0 wt % of ethylene glycol.

In this embodiment, the coating conditions include: a spray air pressure of 1.5 $kg/cm^2$–3.5 $kg/cm^2$, an average particle size of the atomized liquid of 20 $\mu$m, a standard deviation of the particle size of 5 $\mu$m, a spraying rate of 0.4 ml/sec., a spraying time of 50 sec. for the entire surface of the front surface of a 20-inch CRT, and a distance of 30 cm between a nozzle of the spray coating device and the surface of the front panel 21.

Figure 2B:
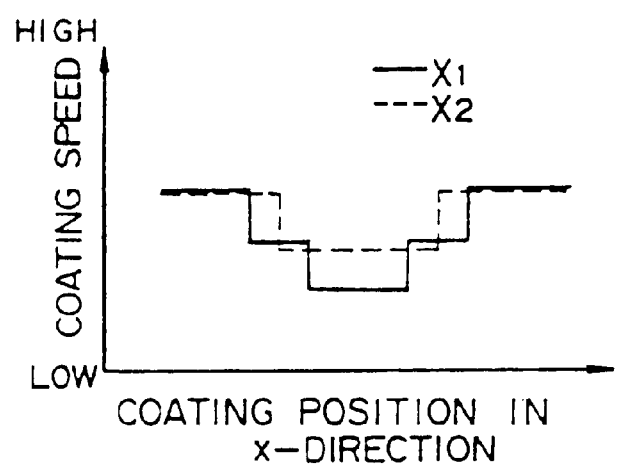
FIGS. 2B and 2C are graphs illustrating a coating quantity distribution in relation to the luminance distribution shown in FIG. 2A.
Figure 2C:
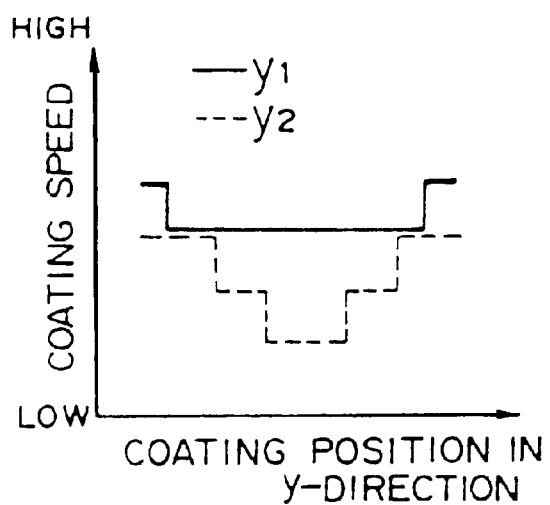

Further, the coating speed is controlled as shown in FIGS. 2B and 2C so that the coating quantity distribution is related to the luminance distribution of the front panel 21 shown in FIG. 2A. In such a manner, the coating quantity is increased at the central portion having a high luminance and is decreased at the peripheral portion having a low luminance.

Thereafter another coating liquid is sprayed onto the first layer to form a second layer. The coating liquid for forming the second layer does not contain a dye but contains 50 wt % of a conductive agent in a solid content. The other components of the coating liquid are the same as those of the coating liquid for forming the first layer. The coating conditions of the coating liquid for the second layer are substantially the same as those of the coating liquid for the first layer, but a temperature of the surface of the front panel 21 is lowered to about 25 degrees C. by the coating liquid for the first layer.

After spraying the coating liquid for the second layer, the CRT is heated by radiation until a temperature of the surface of the front panel 21 becomes about 140° C., thus drying the coating liquid sprayed onto the surface of the front panel 21 to form a nonglare film.

In the CRT manufactured according to the second preferred embodiment, a density of the black dye contained in the nonglare film formed on the front panel 21 is high at the central portion of the front panel 21 and is low at the peripheral portion thereof. Such a difference in density of the black dye causes a difference in light transmittance. This difference in light transmittance and the difference in luminence shown in FIG. 2A counterbalance each other, so that both luminance and contrast become uniform throughout the front panel 21. Further, since silica is contained in the coating liquid, fine roughness is formed on a surface of the nonglare film, so that the film exhibits a nonglare effect such that reflection of background light on the front panel 21 is suppressed.

The water absorbing solvent according to the present invention is not limited to ethylene glycol. For example, the water absorbing solvent may include glycerol, diethylene glycol, propylene glycol, triethylene glycol, and hexylene glycol.

Further, the coating film formed on the surface of the front panel 21 has an electrical resistance of $1 \times 10^9 - 5 \times 10^9$ Ω. That is, the coating film has a conductivity which exhibits an antistatic effect. Further, the nonglare film has a glossiness (gloss value) of 90 in case of an incident angle of 60° C.

Next, the third preferred embodiment will be described. In the third preferred embodiment, the coating liquid for the second layer is substantially the same as in the second preferred embodiment with the exception that ethylene glycol is not used. Furthermore, the coating conditions of the coating liquid for the second layer are substantially the same as those in the second preferred embodiment with the exception that the spray air pressure is set to 3.5 kg/cm$^2$.

In the CRT manufactured according to the third preferred embodiment, the electrical resistance of the nonglare film formed on the surface of the front panel 21 is the same as that in the third preferred embodiment. However, the glossiness in case of the incident angle of 60° is lowered to 50, but a resolution of 65 lines/cm or higher is obtained.

Next, the fourth preferred embodiment will be described. In the fourth preferred embodiment, the coating film consisting of the first and second layers is formed in the same method as that in the second preferred embodiment with the exception that the drying condition of the coating liquid after sprayed for forming the first and second layers is set to about 170° C. for about 20 minutes.

In the second and fourth preferred embodiments mentioned above, the coating liquid for the second layer contains ethylene glycol in addition to the conductive agent and the silica. The relation between the content of ethylene glycol and the quality of the glare-proof effect as well as the clearness shown in Table 1, in which o represents good quality, and x represents poor quality. As Table 1 makes apparent, the content of ethylene glycol is preferably 1.0–8.0 wt %.

TABLE 1

| Content (wt %) | 7-inch Flat Panel | 14-inch Panel |
| --- | --- | --- |
| 0.25 | x | x |
| 0.5 | o | x |
| 1.0 | o | o |
| 2.0 | o | o |
| 4.0 | o | o |
| 8.0 | o | o |
| 10.0 | x | x |

Further, the relation between the content of ethylene glycol and the glossiness in a 29-inch CRT is shown in Table 2. As apparent from Table 2, there is a large difference in glossiness between the cases where ethelyne glycol is present and the case where it is absent. However, there is not a large difference in glossiness when ethelyne glycol is present.

TABLE 2

| Content (wt %) | Glossiness (Gloss Value) |
| --- | --- |
| 0 | 80.4 |
| 1.0 | 87.2 |
| 2.0 | 88.3 |
| 4.0 | 86.4 |
| 8.0 | 87.1 |

Figure 4:
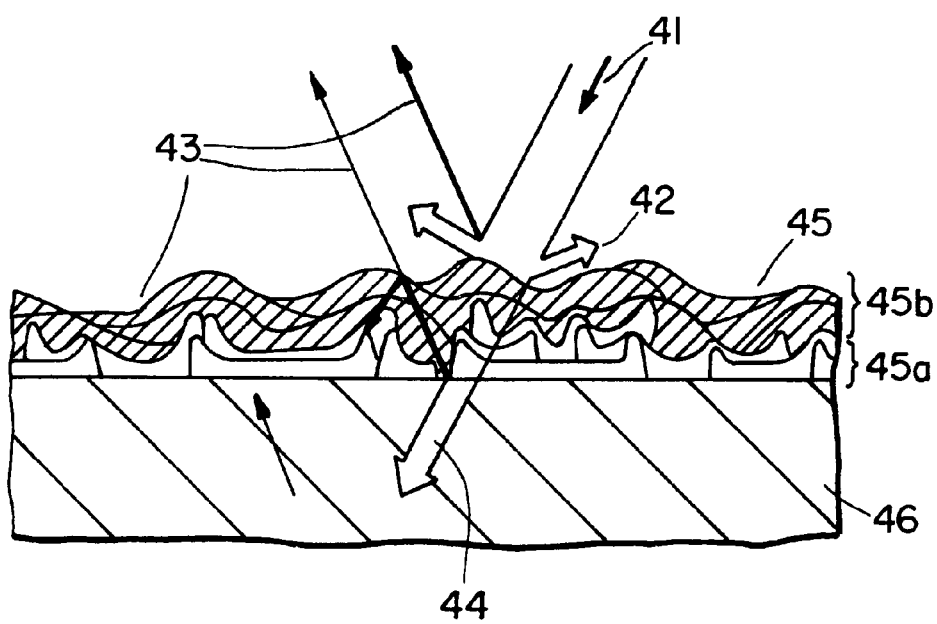
FIG. 4 is a side view of a nonglare film formed on a front panel according to a fifth preferred embodiment of the present invention.

A method of fabricating the CRT in the fifth embodiment, shown in FIG. 4, will be described hereinafter. In FIG. 4, the reference numerals 41, 42, 43 and 44 denote incident light, diffused light, reflected light, and transmitted light, respectively.

The shape of the antistatic layer 45a, i.e., the first layer, containing an inorganic metal compound, employed in the fifth preferred embodiment is the same as that of the film shown in FIG. 3A. The antistatic layer 45a is formed by depositing droplets of the coating liquid onto a panel 46 and drying the droplets rapidly so that the film serving as the antistatic layer 45a has an irregular surface with circular pits formed by the impinging droplets of the coating liquid. The shape of the visible light absorbing layer 45b containing black dye (ie. the second layer) is the same as that of the film shown in FIG. 3B.

The visible light absorbing layer 45b is formed by depositing droplets of a liquid coating material onto the panel 46, and then drying the liquid coating material after allowing the droplets of the liquid coating material to collapse. The visible light absorbing layer 45b is formed in a smooth, matte surface having a plurality of circular pits and elliptic pits.

A semifinished CRT, namely, a CRT having all its components except the nonglare film 45, was completed through steps of processes shown in Table 3.

TABLE 3

1 Processes
2 Setting of the semifinished CRT for coating
3 Cleaning of the front panel
4 Preheating
5 Forming the first layer TABLE 3-continued 6 Forming the second layer
7 Heating for hardening
8 Delivery
9 Details and conditions of the processes
10 Grinding and cleaning of the surface of the panel
11 Heating the panel at 40° C. for ten minutes to stabilize the panel for coating
12 Spraying an antistatic liquid containing an ethyl silicate solution as binder over the surface of the panel to form the first layer having minute pits formed by impinging droplets of the antistatic liquid
13 Spraying an ethyl silicate solution containing a black dye over the first layer to form the second layer for coloring and smoothing the surface of the first layer
14 Heating the panel at 160° C. for twenty minutes to harden the nonglare film completely
15 Cooling the CRT

| Composition of the First Coating Liquid: | |
|---|---|
| (First layer) | |
| Tin protoxide (SnO) powder: | 50% by weight |
| Solid ethyl silicate: | 2.0% by weight |
| Coating Conditions | |
| Pressure of compressed air for spraying: | 2.5 kg/cm² |
| Surface resistivity: | 2 × 10⁹ Ω |
| Composition of the Second Coating Liquid: | |
| (Second layer) | |
| Black dye: | 0.3% by weight |
| Ethyl silicate: | 2.0% by weight |
| Coating Conditions | |
| Pressure of compressed air for spraying: | 2.0 kg/cm³ |
| Light transmittance: | 85 to 90% |
| Haze: | ≈3% |
| Gloss G (60°): | 80 to 85 |

Figure 5:
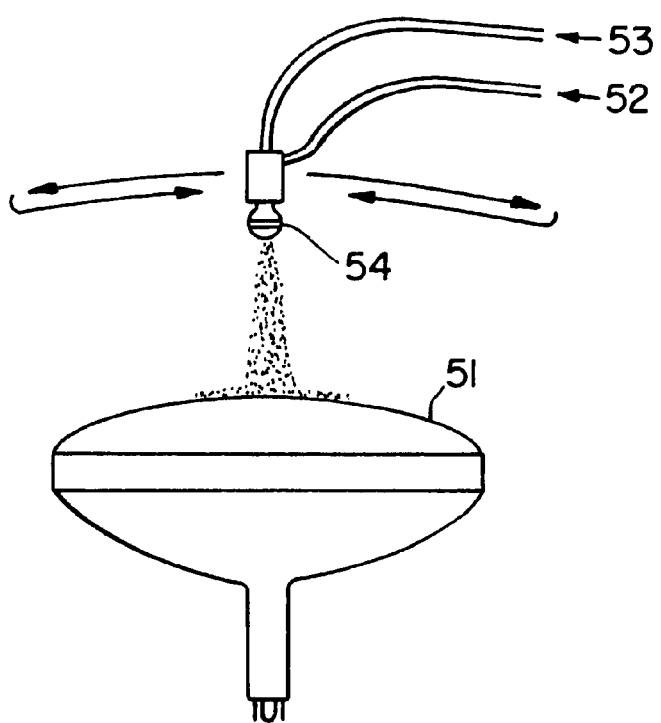
FIG. 5 is an illustrative schematic sectional view showing a method of spraying a coating liquid with compressed air to coat on a surface of a front panel uniformly.

When coating the surface of the panel with the coating liquid, the surface of the panel of the CRT 51 is scanned by the spray nozzle 54 to spray the coating liquid 52 with compressed air 53 to coat the surface of the panel uniformly with the coating liquid as shown in FIG. 5.

The nonglare film 45 consisting of the antistatic layer 45*a* (i.e., the first layer) and the visible light absorbing layer 45*b* (ie., the second layer) coats the surface of the panel of the CRT, diffuses light, prevents the electrification of the panel, suppresses the reflected light 43 (the reflection of the ambient scenery on the panel) and improves the contrast of pictures displayed on the CRT.

In this specification, the gloss is defined as follows:

Reference Gloss

When light of a specified intensity is projected at an angle of incidence θ onto the surface of a reference block formed of glass having a refractive index of 1.567, the intensity of reflected light reflected at an angle of reflection θ is defined as having a value of 100. Gloss is dependent on the angle θ. In this embodiment, gloss is indicated by Gloss (60°) or G(60°), in which the angle θ=60°.

Haze indicates the degree of cloudiness of a surface and is indicated by a value obtained by calculation using the following expression.

Haze={(Luminous diffuse transmittance)/(Total ray transmittance)}×100 (%)

Sixth Embodiment

The surfaces of the front panels of the CRTs in the sixth embodiment is coated with the nonglare film by the same processes under the following different process conditions:

| | |
|---|---|
| Preheating temperature: | 40° C. |
| Content of conductive agent: | 55 wt %/solids |
| Content of silica: | 0.6 wt % |
| Content of denatured ethyl alcohol: | 90 wt % |
| Content of pure water: | 8 wt % |
| Spraying rate: | 0.4 ml/sec (40 sec) |
| Spraying distance (Panel-Nozzle): | 23 cm |
| Content of black dye: | 0.13 wt % |
| Content of silica: | 1.5 wt % |
| Content of denatured ethyl alcohol: | 58 wt% |
| Content of pure water: | 40 wt % |
| Spraying rate: | 0.4 ml/sec (50 sec) |
| Spraying distance (Panel-Nozzle): | 25 cm |

The characteristics of the surfaces of the front panel of the CRTs in the sixth embodiment were the same as those of the surface of the front panel of the CRT in the fifth embodiment.

Figure 6:
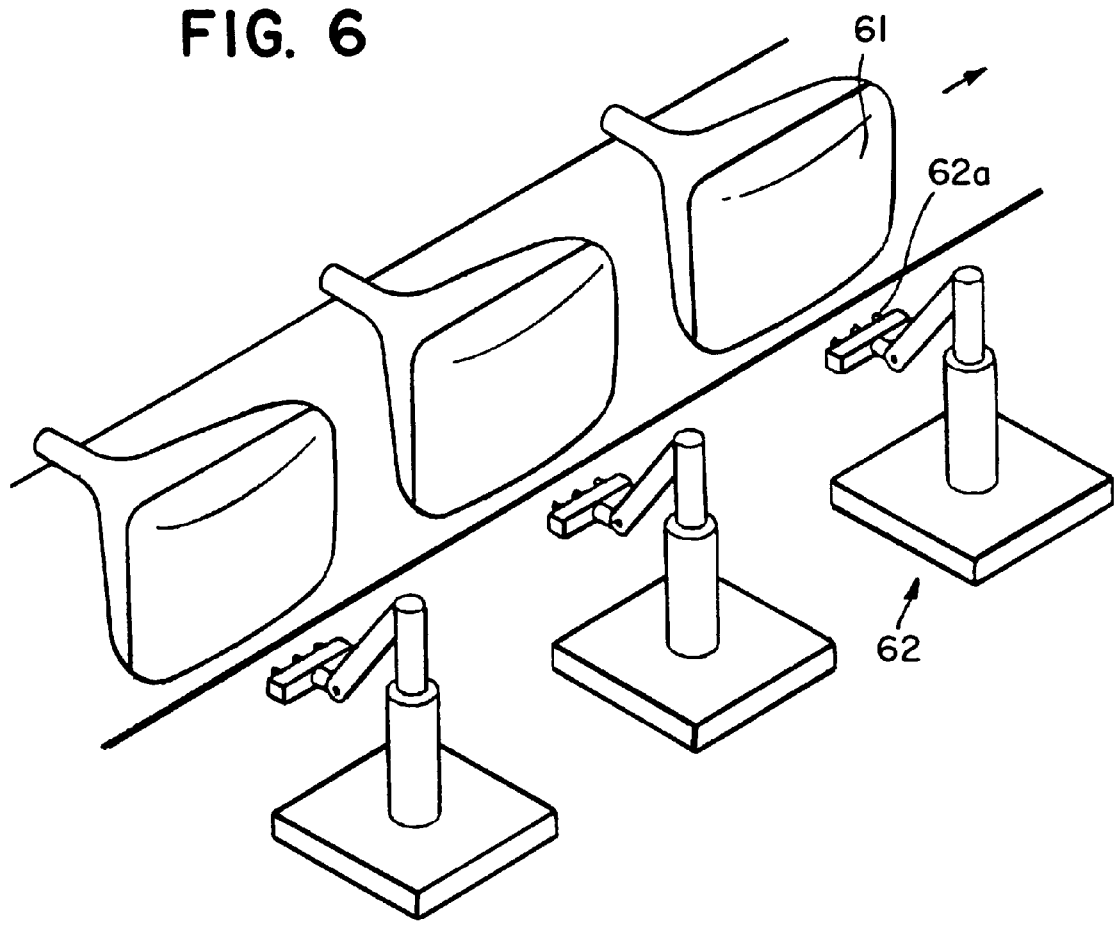
FIG. 6 is a perspective view of a painting robot which forms a nonglare film.

The surfaces of the front panels of the CRTs embodying the present invention may be coated with the antistatic layer and the visible light absorbing layer by painting robots 62 as shown in FIG. 6. For example, in the fifth embodiment the first layer and second layer of the CRT are formed on the front panel 61 by using one painting robot for the first layer and three painting robots 62 for the second layer. Each of the painting robots is provided with three spraying nozzles 62*a*.

Figure 7:
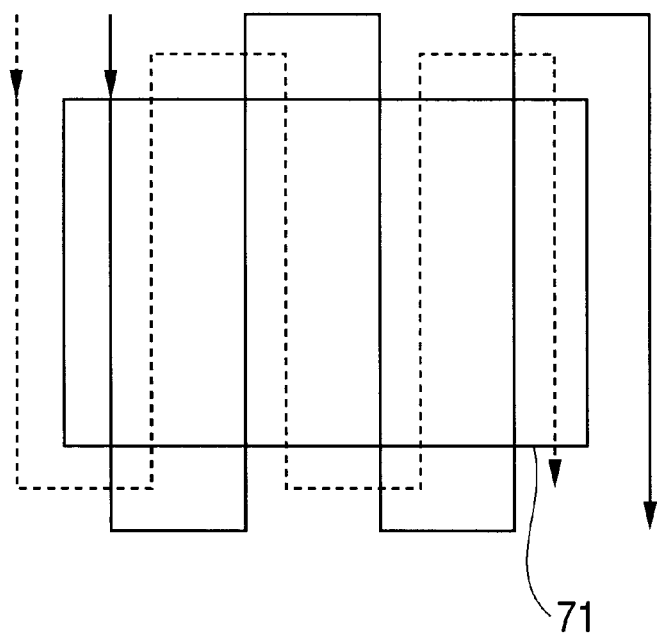
FIG. 7 is a plan view showing a scanning application system which employs a painting robot.

FIG. 7 shows a scanning application system employing a painting robot applying a film onto a CRT front panel 71. Such a film formed by spraying must be dried evenly to form a uniform optical thin film over the surface of the panel of the CRT 71. The film is deposited by moving the nozzles in the same directions for each layer. Further, the nozzles are moved over an area greater than the application area, i.e., the area of the panel of the CRT. Accordingly, the scanning application system is capable of uniformly forming the first layer (ie., the antistatic layer) and the second layer (ie. the visible light absorbing layer) over the entire surface of the panel.

Figure 8:
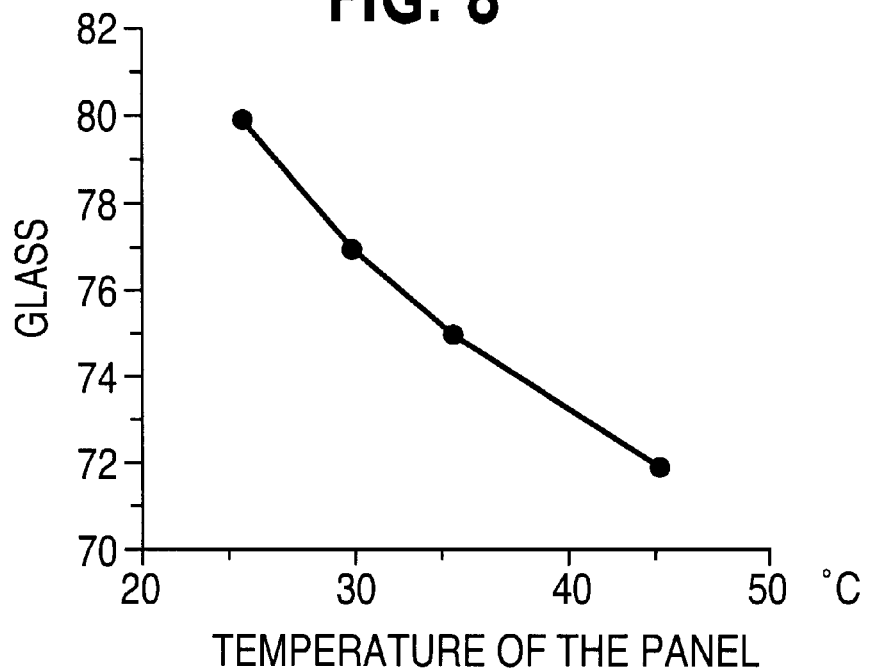
FIG. 8 is a graph showing a dependence of the gloss on a temperature of a panel before coating.

FIG. 8 shows the dependence of the gloss on the temperature of the panel before coating. The following coating conditions were used:

Coating Conditions

| | |
|---|---|
| Ambient temperature: | 28° C. |
| Spraying pressure: | 1.5 kg/cm₂ |
| Scanning speed (Painting robot): | 400 mm/sec |
| Spraying distance (Panel-Nozzle): | 300 mm |
| Number of coats: | Three (Coloring liquid: Only the black dye) |

As is obvious from FIG. 8, the higher the temperature of the panel, the shorter the film drying time and hence the lower the gloss.

Figure 9:
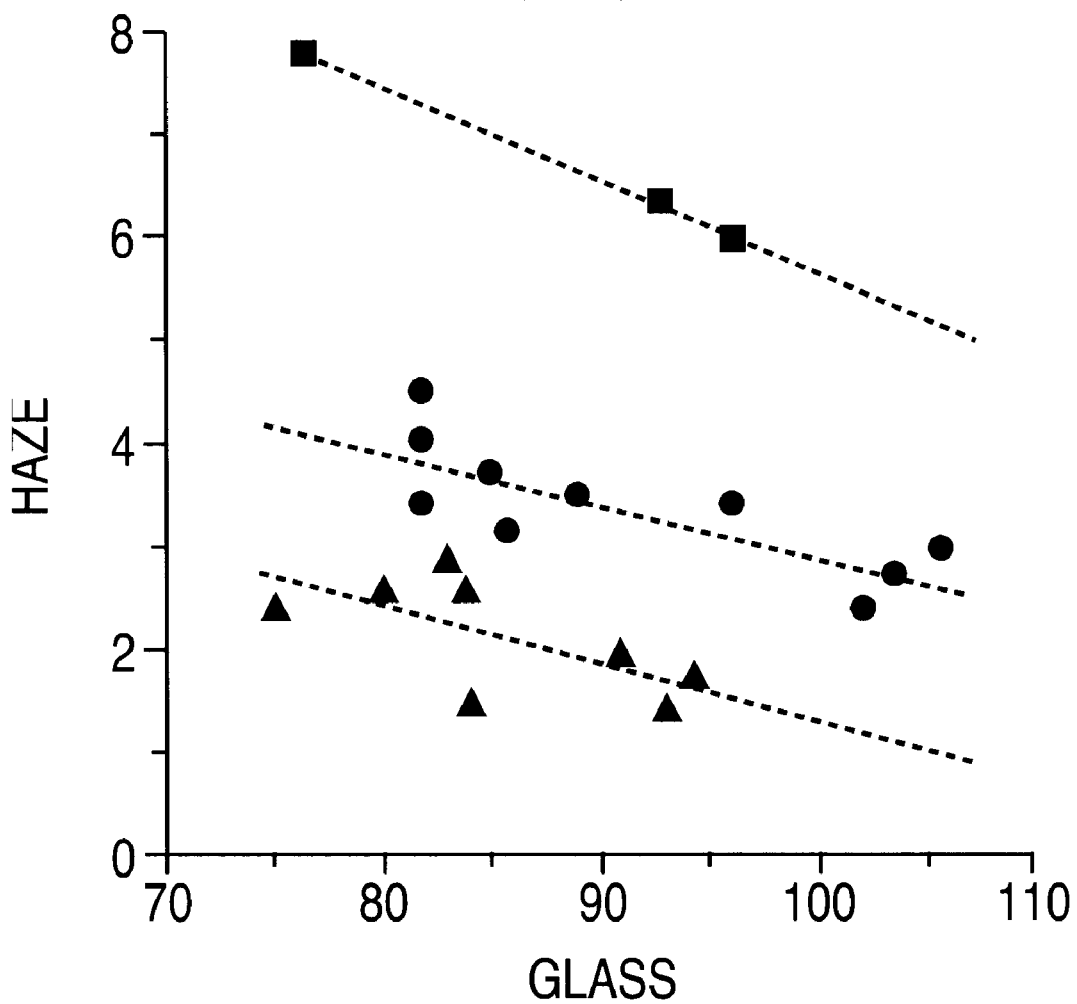
FIG. 9 is a graph illustrating a relation between the haze and the gloss.

FIG. 9 shows the relation between haze and the gloss. In FIG. 9, the mark ■ denotes a coating liquid including 0.47 wt % of conductive agent and black dye, the mark ● denotes a coating liquid including 0.47 wt % of black dye, and the mark ▲ denotes a coating liquid including 0.24 wt % of black dye.

As is obvious from FIG. 9, the coating liquid (1) containing the conductive agent forms a film having a haze higher than those of films formed of the coating liquids (2) and (3). The haze of a film formed of the coating liquid (2), which has a black dye content greater than that of the coating liquid (3), is higher than that of a film formed of the coating liquid (3).

FIG. 10 shows the relation between the gloss and the spraying time.

Coating Conditions

| | |
|---|---|
| Ambient temperature: | 28° C. |
| Humidity: | 58 to 64% |
| Temperature of the panel: | 30° C. |
| Spraying pressure: | 1.5 kg/cm$_2$ |
| Scanning speed: | 400 mm/sec |
| Spraying distance (Panel-Nozzle): | 300 mm |
| Number of coats: | Three (Coloring liquid) |

As is obvious from FIG. 10, the gloss (before baking) increases with an increase of spraying time and saturates at a certain spraying time.

According to these embodiments mentioned above, a part of light to be scattered by the nonglare film having the above-mentioned surface roughness is absorbed by the visible light absorbing layer. Accordingly, even when the CRT is used at a bright place exposed to a large quantity of external light, the surface of the front panel 1 does not look whitish, thereby preventing a reduction in sharpness of a reproduced image.

Furthermore, static electricity generated on the front panel during operation of the CRT can be reduced by the antistatic layer, thereby preventing deposition of dust, electrical shock, etc. due to charging of the front panel.

While 40–60 wt % of metal oxide is contained in a solid content of the antistatic layer, the nonglare film has a strength durable enough for long-term usage since it has a multi-layered structure.

The nonglare film of the present invention provides a CRT surface panel which is more pleasing to view. This surface suppresses haze which arises from the use of a silicon coating having strong external light diffusing properties and which produces interference colors caused by the interference of light of certain wavelengths. It also suppresses haze produced by an antireflection coating which may be caused by surface color variation dependent on viewing angle.

Although the invention has been described in its preferred form with a certain degree of particularity, obviously many changes and variations are possible therein. It is therefore to be understood that the present invention may be used otherwise than as specifically described herein without departing from the scope and spirit thereof.

What is claimed is:

1. A cathode ray tube, comprising:
   a front panel coated with a nonglare film having a multi-layered structure, wherein said multi-layered structure comprises:
   a light absorbing layer containing a colored dye, and
   an antistatic layer containing an inorganic metal compound as an electrically conductive agent, wherein said inorganic metal compound is at least 40% by weight of said antistatic layer.

2. The cathode ray tube as recited in claim 1, wherein said multi-layered structure is a double-layered structure consisting essentially of said light absorbing layer and said antistatic layer.

3. The cathode ray tube as recited in claim 1, wherein said light absorbing layer is formed between the front panel and the antistatic layer.

4. The cathode ray tube as recited in claim 1, wherein said light absorbing layer includes a water absorbing solvent selected from the group consisting of ethylene glycol, glycerol, diethylene glycol, propylene glycol, triethylene glycol, and hexylene glycol.

5. The cathode ray tube as recited in claim 1, wherein said multi-layered structure is made by coating said light absorbing layer and said antistatic layer upon a face plate of said cathode ray tube.

6. The cathode ray tube as recited in claim 1, wherein said light absorbing layer has a visible light absorptivity of 10–30%.

7. The cathode ray tube as recited in claim 1, wherein said inorganic metal compound has a particle size equal to or smaller than 0.01 μm for optimal surface roughness and image resolution.

8. The cathode ray tube as recited in claim 1, wherein said antistatic layer contains $SiO_2$.

9. The cathode ray tube as recited in claim 1, wherein said antistatic layer has a surface resistivity between $1 \times 10^9$ to $5 \times 10^9$ Ω.

10. The cathode ray tube as recited in claim 1, wherein said light absorbing layer contains $SiO_2$.

11. The cathode ray tube as recited in claim 1, wherein the light absorbing layer has a light transmittance from 85 to 90%.

12. The cathode ray tube as recited in claim 1, wherein said light absorbing layer comprises a visible light absorbing layer containing a black dye.

13. The cathode ray tube as recited in claim 1, wherein said inorganic metal compound comprises a metal oxide including a metal selected from the group consisting of tin, gold, palladium, platinum, iron, titanium, and aluminum.

14. The cathode ray tube as recited in claim 8, wherein the ratio by weight of said inorganic metal compound to said $SiO_2$ in said antistatic layer is at least 4 to 1.

15. The cathode ray tube as recited in claim 1, wherein said inorganic metal compound is 40 to 60% by weight of said antistatic layer.

16. The cathode ray tube as set forth in claim 1, wherein said multi-layered structure has a thickness of approximately 0.5 μm.

17. The cathode ray tube as set forth in claim 1, wherein said light absorbing layer has a thickness of approximately 0.25 μm.

18. The cathode ray tube as set forth in claim 1, wherein said antistatic layer has a thickness of approximately 0.25 μm.

* * * * *